United States Patent
Kleekajai et al.

(10) Patent No.: US 9,277,144 B2
(45) Date of Patent: Mar. 1, 2016

(54) SYSTEM AND METHOD FOR ESTIMATING AN AMBIENT LIGHT CONDITION USING AN IMAGE SENSOR AND FIELD-OF-VIEW COMPENSATION

(71) Applicant: Apple Inc., Cupertino, CA (US)

(72) Inventors: Suppawan Kleekajai, Santa Clara, CA (US); Micah P. Kalscheur, San Francisco, CA (US); Michael R. Malone, San Jose, CA (US)

(73) Assignee: Apple Inc., Cupertino, CA (US)

(*) Notice: Subject to any disclaimer, the term of this patent is extended or adjusted under 35 U.S.C. 154(b) by 8 days.

(21) Appl. No.: 14/207,176

(22) Filed: Mar. 12, 2014

(65) Prior Publication Data
US 2015/0264278 A1 Sep. 17, 2015

(51) Int. Cl.
*H04N 5/235* (2006.01)
*H04N 5/335* (2011.01)

(52) U.S. Cl.
CPC ............. *H04N 5/335* (2013.01); *H04N 5/2351* (2013.01)

(58) Field of Classification Search
CPC .................................................. H04N 5/2351
USPC ............................................. 348/221.7, 366
See application file for complete search history.

(56) References Cited

U.S. PATENT DOCUMENTS

| | | | |
|---|---|---|---|
| 4,686,648 A | 8/1987 | Fossum | |
| 5,105,264 A | 4/1992 | Erhardt et al. | |
| 5,329,313 A | 7/1994 | Keith | |
| 5,396,893 A | 3/1995 | Oberg et al. | |
| 5,880,459 A | 3/1999 | Pryor et al. | |
| 6,040,568 A | 3/2000 | Caulfield et al. | |
| 6,233,013 B1 | 5/2001 | Hosier et al. | |
| 6,348,929 B1 | 2/2002 | Acharya et al. | |
| 6,713,796 B1 | 3/2004 | Fox | |
| 6,714,239 B2 | 3/2004 | Guidash | |
| 6,798,453 B1 | 9/2004 | Kaifu | |
| 6,816,676 B2 * | 11/2004 | Bianchi .................. | G03B 17/18 348/333.01 |

(Continued)

FOREIGN PATENT DOCUMENTS

| | | |
|---|---|---|
| CN | 1842138 | 10/2006 |
| CN | 101189885 | 5/2008 |

(Continued)

OTHER PUBLICATIONS

U.S. Appl. No. 13/782,532, filed Mar. 1, 2013, Sharma et al.

(Continued)

*Primary Examiner* — Anthony J Daniels
(74) *Attorney, Agent, or Firm* — Brownstein Hyatt Farber Schreck, LLP

(57) ABSTRACT

A system and method for estimating an ambient light condition is using an image sensor of a digital camera. An array of pixels is obtained using the image sensor. A matrix of grid elements is defined. Each grid element comprises multiple adjacent pixels of the array of pixels. A first measurement value is generated for a grid element of the matrix of grid elements based on the pixels associated with the grid element. A set of grid elements are identified having a first measurement value that satisfies a brightness criteria. A second measurement is generated using the identified set of grid elements. A simulated-light-sensor array is generated using the second measurement value. An estimate of the ambient light condition is calculated using the simulated-light-sensor array.

20 Claims, 11 Drawing Sheets

(56) References Cited

U.S. PATENT DOCUMENTS

| | | |
|---|---|---|
| 6,905,470 B2 | 6/2005 | Lee et al. |
| 6,982,759 B2 | 1/2006 | Goto |
| 7,091,466 B2 | 8/2006 | Bock |
| 7,259,413 B2 | 8/2007 | Rhodes |
| 7,262,401 B2 | 8/2007 | Hopper et al. |
| 7,271,835 B2 | 9/2007 | Iizuka |
| 7,282,028 B2 | 10/2007 | Kim et al. |
| 7,332,786 B2 | 2/2008 | Altice |
| 7,390,687 B2 | 6/2008 | Boettiger |
| 7,437,013 B2 | 10/2008 | Anderson |
| 7,443,421 B2 | 10/2008 | Stavely et al. |
| 7,502,054 B2 | 3/2009 | Kalapathy |
| 7,525,168 B2 | 4/2009 | Hsieh |
| 7,554,067 B2 | 6/2009 | Zarnoski et al. |
| 7,555,158 B2 | 6/2009 | Lee |
| 7,626,626 B2 | 12/2009 | Panicacci |
| 7,671,435 B2 | 3/2010 | Ahn |
| 7,728,351 B2 | 6/2010 | Shim |
| 7,733,402 B2 | 6/2010 | Egawa et al. |
| 7,742,090 B2 | 6/2010 | Street |
| 7,773,138 B2 | 8/2010 | Lahav et al. |
| 7,796,171 B2 | 9/2010 | Gardner |
| 7,873,236 B2 | 1/2011 | Li et al. |
| 7,880,785 B2 | 2/2011 | Gallagher |
| 7,884,402 B2 | 2/2011 | Ki |
| 7,906,826 B2 | 3/2011 | Martin et al. |
| 7,952,121 B2 | 5/2011 | Arimoto |
| 7,952,635 B2 | 5/2011 | Lauxtermann |
| 8,026,966 B2 | 9/2011 | Altice |
| 8,032,206 B1 | 10/2011 | Farazi et al. |
| 8,089,524 B2 | 1/2012 | Urisaka |
| 8,094,232 B2 | 1/2012 | Kusaka |
| 8,140,143 B2 | 3/2012 | Picard et al. |
| 8,153,947 B2 | 4/2012 | Barbier et al. |
| 8,159,588 B2 | 4/2012 | Boemler |
| 8,184,188 B2 | 5/2012 | Yaghmai |
| 8,194,148 B2 | 6/2012 | Doida |
| 8,194,165 B2 | 6/2012 | Border et al. |
| 8,227,844 B2 | 7/2012 | Adkisson |
| 8,233,071 B2 | 7/2012 | Takeda |
| 8,259,228 B2 | 9/2012 | Wei et al. |
| 8,310,577 B1 | 11/2012 | Neter |
| 8,324,553 B2 | 12/2012 | Lee |
| 8,340,407 B2 | 12/2012 | Kalman |
| 8,350,940 B2 | 1/2013 | Smith et al. |
| 8,400,546 B2 | 3/2013 | Itano et al. |
| 8,456,559 B2 | 6/2013 | Yamashita |
| 8,508,637 B2 | 8/2013 | Han et al. |
| 8,514,308 B2 | 8/2013 | Itonaga et al. |
| 8,547,388 B2 | 10/2013 | Cheng |
| 8,581,992 B2 | 11/2013 | Hamada |
| 8,619,163 B2 | 12/2013 | Ogua |
| 8,629,484 B2 | 1/2014 | Ohri et al. |
| 8,634,002 B2 | 1/2014 | Kita |
| 8,648,947 B2 | 2/2014 | Sato et al. |
| 8,723,975 B2 | 5/2014 | Solhusvik |
| 8,754,983 B2 | 6/2014 | Sutton |
| 8,755,854 B2 | 6/2014 | Addison et al. |
| 8,803,990 B2 | 8/2014 | Smith |
| 8,817,154 B2 | 8/2014 | Manabe et al. |
| 8,902,330 B2 | 12/2014 | Theuwissen |
| 8,908,073 B2 | 12/2014 | Minagawa |
| 8,934,030 B2 | 1/2015 | Kim et al. |
| 8,946,610 B2 | 2/2015 | Iwabuchi et al. |
| 8,982,237 B2 | 3/2015 | Chen |
| 9,054,009 B2 | 6/2015 | Oike et al. |
| 9,066,017 B2 | 6/2015 | Geiss |
| 9,066,660 B2 | 6/2015 | Watson et al. |
| 9,088,727 B2 | 7/2015 | Trumbo |
| 9,099,604 B2 | 8/2015 | Roy |
| 9,100,597 B2 | 8/2015 | Hu |
| 9,131,171 B2 | 9/2015 | Aoki et al. |
| 2003/0036685 A1 | 2/2003 | Goodman et al. |
| 2004/0207836 A1 | 10/2004 | Chhibber et al. |
| 2006/0274161 A1* | 12/2006 | Ing ................. H04N 5/235 348/229.1 |
| 2007/0263099 A1 | 11/2007 | Motta et al. |
| 2008/0177162 A1 | 7/2008 | Bae et al. |
| 2008/0315198 A1 | 12/2008 | Jung |
| 2009/0096901 A1 | 4/2009 | Bae et al. |
| 2009/0101914 A1 | 4/2009 | Hirotsu et al. |
| 2009/0201400 A1 | 8/2009 | Zhang et al. |
| 2010/0134631 A1 | 6/2010 | Voth |
| 2011/0028802 A1 | 2/2011 | Addison et al. |
| 2011/0043534 A1* | 2/2011 | Cheng ................. G09G 3/3406 345/589 |
| 2011/0080500 A1 | 4/2011 | Wang et al. |
| 2011/0156197 A1 | 6/2011 | Tivarus et al. |
| 2011/0205415 A1 | 8/2011 | Makino et al. |
| 2011/0245690 A1 | 10/2011 | Watson et al. |
| 2012/0092541 A1* | 4/2012 | Tuulos ................. H04N 5/2351 348/333.01 |
| 2012/0098964 A1 | 4/2012 | Oggier et al. |
| 2012/0153125 A1 | 6/2012 | Oike et al. |
| 2013/0147981 A1* | 6/2013 | Wu ........................ G09G 3/20 348/222.1 |
| 2013/0155271 A1 | 6/2013 | Ishii |
| 2014/0004644 A1 | 1/2014 | Roy |
| 2014/0049683 A1 | 2/2014 | Guenter |
| 2014/0071321 A1 | 3/2014 | Seyama |
| 2014/0240550 A1 | 8/2014 | Taniguchi |
| 2014/0246568 A1 | 9/2014 | Wan |
| 2014/0247378 A1 | 9/2014 | Sharma et al. |
| 2014/0252201 A1 | 9/2014 | Li et al. |
| 2014/0253754 A1 | 9/2014 | Papiashvili |
| 2014/0253768 A1 | 9/2014 | Li |
| 2014/0263951 A1 | 9/2014 | Fan et al. |
| 2014/0267855 A1 | 9/2014 | Fan |
| 2014/0347533 A1 | 11/2014 | Toyoda |
| 2014/0354861 A1 | 12/2014 | Pang |
| 2015/0163392 A1 | 6/2015 | Malone et al. |
| 2015/0163422 A1 | 6/2015 | Fan et al. |
| 2015/0237314 A1 | 8/2015 | Hasegawa |
| 2015/0264241 A1 | 9/2015 | Kleekajai et al. |
| 2015/0312479 A1 | 10/2015 | McMahon et al. |
| 2015/0350575 A1 | 12/2015 | Agranov et al. |

FOREIGN PATENT DOCUMENTS

| | | |
|---|---|---|
| CN | 101233763 | 7/2008 |
| CN | 101472059 | 7/2009 |
| CN | 101567977 | 10/2009 |
| CN | 101622859 | 1/2010 |
| CN | 101803925 | 8/2010 |
| CN | 102036020 | 4/2011 |
| CN | 102821255 | 12/2012 |
| CN | 103329513 | 9/2013 |
| CN | 103546702 | 1/2014 |
| EP | 2023611 | 2/2009 |
| EP | 2107610 | 10/2009 |
| EP | 2230690 | 9/2010 |
| JP | 201149697 | 3/2011 |
| KR | 20030034424 | 5/2003 |
| KR | 20030061157 | 7/2003 |
| KR | 2008/0069851 | 7/2008 |
| KR | 20100008239 | 1/2010 |
| KR | 20100065084 | 6/2010 |
| KR | 20130074459 | 7/2013 |
| TW | 201301881 | 1/2013 |
| WO | WO 2010/120945 | 10/2010 |
| WO | WO 2012/053363 | 4/2012 |
| WO | WO 2012/088338 | 6/2012 |
| WO | WO 2012/122572 | 9/2012 |
| WO | WO 2013/008425 | 1/2013 |
| WO | WO 2013/179018 | 12/2013 |
| WO | WO 2013/179020 | 12/2013 |

OTHER PUBLICATIONS

U.S. Appl. No. 13/783,536, filed Mar. 4, 2013, Wan.
U.S. Appl. No. 13/785,070, filed Mar. 5, 2013, Li.
U.S. Appl. No. 13/787,094, filed Mar. 6, 2013, Li et al.
U.S. Appl. No. 13/797,851, filed Mar. 12, 2013, Li.
U.S. Appl. No. 13/830,748, filed Mar. 14, 2013, Fan.

(56) References Cited

OTHER PUBLICATIONS

U.S. Appl. No. 14/098,504, filed Dec. 5, 2013, Fan et al.
U.S. Appl. No. 14/207,150, filed Mar. 12, 2014, Kleekajai et al.
U.S. Appl. No. 14/276,728, filed May 13, 2014, McMahon et al.
U.S. Appl. No. 14/292,599, filed May 30, 2014, Agranov et al.
Feng, et al., "On the Stoney Formula for a Thin Film/Substrate System with Nonuniform Substrate Thickness," Journal of Applied Mechanics, Transactions of the ASME, vol. 74, Nov. 2007, pp. 1276-1281.
Schwarzer, et al., On the determination of film stress from substrate bending: Stoney's formula and its limits, Jan. 2006, 17 pages.
U.S. Appl. No. 14/462,032, filed Aug. 18, 2014, Jiang et al.
Aoki et al., "Rolling-Shutter Distortion-Free 3D Stacked Image Sensor with −160dB Parasitic Light Sensitivity In-Pixel Storage Node," ISSCC 2013, Session 27, Image Sensors, 27.3 27.3 A, Feb. 20, 2013, retrieved on Apr. 11, 2014 from URL:http://ieeexplore.ieee.org/stamp/stamp.jsp?tp=&arnumber=6487824.
Elgendi, "On the Analysis of Fingertip Photoplethysmogram Signals," Current Cardiology Reviews, 2012, vol. 8, pp. 14-25.
Fu, et al., "Heart Rate Extraction from Photoplethysmogram Waveform Using Wavelet Multui-resolution Analysis," Journal of Medical and Biological Engineering, 2008, vol. 28, No. 4, pp. 229-232.
Han, et al., "Artifacts in wearable photoplethysmographs during daily life motions and their reduction with least mean square based active noise cancellation method," Computers in Biology and Medicine, 2012, vol. 42, pp. 387-393.
Lopez-Silva, et al., "Heuristic Algorithm for Photoplethysmographic Heart Rate Tracking During Maximal Exercise Test," Journal of Medical and Biological Engineering, 2011, vol. 12, No. 3, pp. 181-188.
Santos, et al., "Accelerometer-assisted PPG Measurement During Physical Exercise Using the LAVIMO Sensor System," Acta Polytechnica, 2012, vol. 52, No. 5, pp. 80-85.
Sarkar, et al., "Fingertip Pulse Wave (PPG signal) Analysis and Heart Rate Detection," International Journal of Emerging Technology and Advanced Engineering, 2012, vol. 2, No. 9, pp. 404-407.
Schwarzer, et al., On the determination of film stress from substrate bending: STONEY'S formula and its limits, Jan. 2006, 19 pages.
Yan, et al., "Reduction of motion artifact in pulse oximetry by smoothed pseudo Wigner-Ville distribution," Journal of Neuro Engineering and Rehabilitation, 2005, vol. 2, No. 3, pp. 1-9.
Yousefi, et al., "Adaptive Cancellation of Motion Artifact in Wearable Biosensors," 34th Annual International Conference of the IEEE EMBS, San Diego, California, Aug./Sep. 2012, pp. 2004-2008.

\* cited by examiner

SYSTEM AND METHOD FOR ESTIMATING AN AMBIENT LIGHT CONDITION USING AN IMAGE SENSOR AND FIELD-OF-VIEW COMPENSATION

TECHNICAL FIELD

The present application relates generally to measuring ambient light using an image sensor, and more specifically, to compensating for a narrow field of view when estimating ambient light conditions using a digital camera image sensor.

BACKGROUND

Portable electronic devices may be equipped with one or more sensors for measuring ambient light conditions. Traditionally, an ambient light sensor (ALS) or light meter is used to measure the overall amount of ambient light near a portion of the device. Based on the sensor output of the ALS sensor, a portable electronic device may control the brightness of a display or disable the operation of a touch interface. In a typical implementation, an ALS sensor includes a large-area photodiode or other type photoelectric detector that is configured to produce an electrical signal in response to light incident on the surface of the sensor. Traditionally, an ALS sensor is operated continuously to monitor and detect changes in ambient lighting conditions.

Portable electronic devices may also include a digital camera having an image sensor that can be used to record digital images and video. An image sensor typically comprises an array of sensor cells or sensor regions that can be used to produce an array of pixel values also referred to as a digital image. To conserve power and computing resources, an image sensor of a digital camera is typically operated intermittently, as necessary to record a digital image or video.

Traditionally, the ambient light sensor and the digital image sensor are separate sensors that are configured to perform distinctly different functions. However, in some cases a single sensor may perform the functionality of both the image sensor and the ambient light sensor. While using a single sensor potentially reduces the number of components in the device, the functionality of the single sensor may be limited as compared to a traditional ambient light sensor. For example, the field of view of a traditional image sensor may be many times smaller than a traditional ambient light sensor. The reduced field of view may lead to inconsistent or inaccurate results when computing an ambient light estimate using such an image sensor.

The systems and techniques described herein can be used to implement a single sensor as both a digital image sensor and an ambient light sensor. In particular, a digital image sensor can be adapted to measure ambient light conditions that correlate more closely to measurements taken using a traditional separate ambient light sensor.

SUMMARY

In one example embodiment, an ambient light condition is estimated using an image sensor of a digital camera. An array of pixels is obtained using the image sensor. A matrix of grid elements is defined. Each grid element comprises multiple adjacent pixels of the array of pixels. A first measurement value is generated for a grid element of the matrix of grid elements based on the pixels associated with the grid element. A set of grid elements are identified having a first measurement value that satisfies a brightness criteria. A second measurement is generated using the identified set of grid elements. A simulated-light-sensor array is generated using the second composite sensor value. An ambient light estimate is calculated using the simulated-light-sensor array.

In some embodiments, generating the first measurement value includes calculating a mean brightness value using the pixels associated with the grid element. In some embodiments, the brightness criteria is a threshold value and the identified set of grid elements have first measurement values that exceed the brightness criteria. In some embodiments, the threshold value is a multiple of a standard deviation from a mean intensity value. In other embodiments, the threshold value is a fixed offset from a mean intensity value. In some embodiments, the weighted measurement value is generated by multiplying the first measurement value by a weight factor.

In one embodiment, the estimate of the ambient light condition is an illuminance value that represents the luminous flux of light incident on the image sensor. In one embodiment, the area of the grid element is approximately 0.5% of a total area of the array of pixels.

In some embodiments, the image sensor operates in a light-sensor mode and in a camera mode. In some cases, the array of pixels are generated using a subset of sensor cells of the image sensor while the image sensor is operating in a light-sensor mode. In some cases a digital image is generated using a full set of sensor cells of the image sensor operating in a camera mode. Either the array of pixels or the digital image may be stored in computer memory.

On one example embodiment, the brightness of a display of the device is set based on the ambient light estimate. For example, a first ambient light estimate may be calculated using a first array of pixels obtained using the image sensor. A second ambient light estimate may be calculated using a second array of pixels obtained using the image sensor. A difference between the first ambient light estimate and the second ambient light estimate is determined and the brightness of the display of the device is based on the difference. In some embodiments, the brightness of the display is increased if the second ambient light estimate is greater than the first ambient light estimate, and the brightness of the display is decreased if the second ambient light estimate is less than the first ambient light estimate.

One example embodiment includes a portable electronic device that is configured to calculate an ambient light estimate. The portable electronic device includes a digital camera having an image sensor. The image sensor is formed from an array of sensor cells. The portable electronic device also includes a computer processor for executing computer-readable instructions and a computer memory for storing the computer-readable instructions. The instructions may be for: obtaining an array of pixels using the image sensor; defining a matrix of grid elements, each grid element comprised of multiple adjacent pixels of the array of pixels; generating a first measurement value for a grid element of the matrix of grid elements based on the pixels associated with a respective grid element; identifying a set of grid elements having a first measurement value that satisfies a brightness criteria; generating a second measurement using the identified set of grid elements; generating a simulated-light-sensor array using the second measurement value; and calculating the ambient light estimate using the simulated-light-sensor array.

DETAILED DESCRIPTION

A portable electronic device may include one or more ambient light sensors for estimating an ambient lighting condition near the device. The portable electronic device typically includes a processor or other control circuitry that is configured to modify the appearance of a display or the functionality of the device based on the ambient lighting condition. For example, in some cases, the ambient light sensor may be used to detect whether the portable electronic device is being used indoors in a relatively bright ambient light condition (associated with natural or outdoor lighting conditions) or a relatively dim ambient light condition (associated with artificial or indoor lighting conditions). In response to a signal from the ambient light sensor, the control circuitry of the portable electronic device may increase or decrease the brightness of a computer display screen. If the portable electronic device is a mobile telephone, the ambient light sensor may also be used to detect when the mobile phone is placed against the user's face. In this case, the control circuitry of the portable electronic device may disable a touch screen display and/or the computer display screen.

Some portable electronic devices may also include one or more digital cameras having an image sensor for capturing digital images or video. As previously mentioned, it may be advantageous to use the image sensor of a digital camera to function as an ambient light sensor, in part to reduce the part count and complexity of the portable electronic device. However, as previously mentioned, a traditional image sensor may produce a response that does not readily correlate to the output of a traditional ambient light sensor. For example, the field of view (FOV) of a traditional image sensor may be many times less than the FOV of a traditional ambient light sensor. The smaller FOV of the image sensor may lead to inconsistent or inaccurate results when calculating an ambient light estimate.

The techniques and systems described herein relate to using an image sensor to detect an ambient light condition. In particular, the techniques and systems can be used to measure and quantify an ambient light condition that more closely correlates to the output of a traditional, separate ambient light sensor.

1. Portable Electronic Device

Figure 1A:
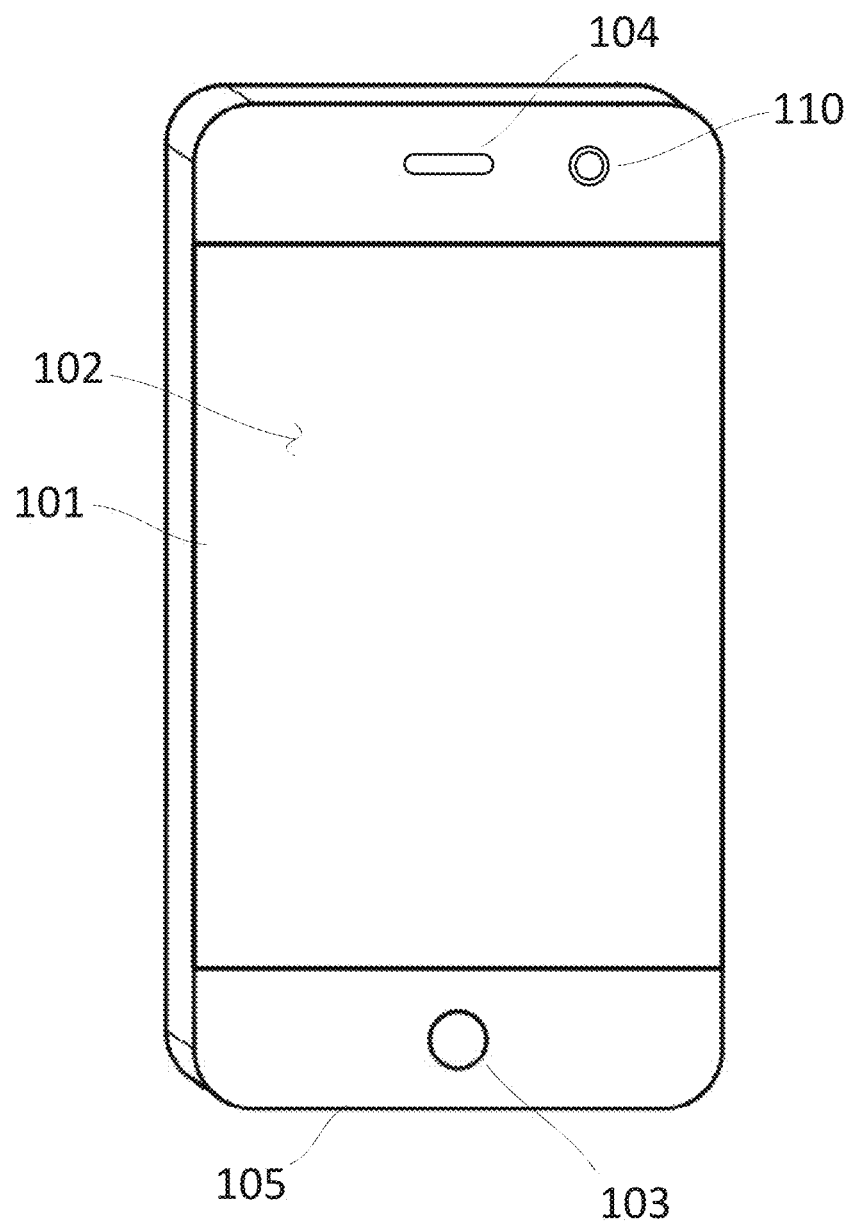
FIGS. 1A-B depict a device having a front and rear digital camera.
Figure 1B:
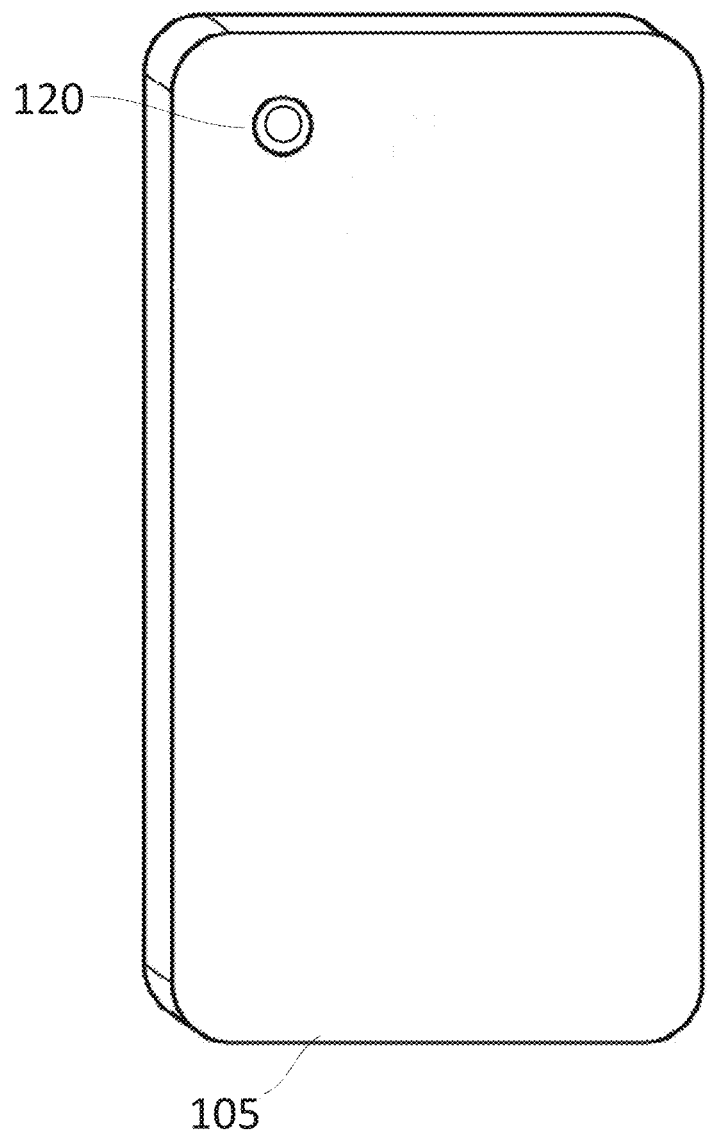

In accordance with various embodiments, FIGS. 1A-B depict a device having at least one camera configured to operate as an ambient light sensor. In particular, FIG. 1A depicts the front side of a device 100 having a front camera 110, and FIG. 1B depicts the rear side of device 100 having a rear camera 120. In the present example, either the front camera 110, the rear camera 120, or both are configured to operate as an ambient light sensor.

As shown in FIG. 1A, the device 100 includes a display 101 for presenting or displaying a user interface to the user. The device 100 also includes a touch sensor 102 and a control button 103 for receiving touch input from the user. In this example, the device 100 is a mobile telephone having a speaker 104 and a microphone 105 for producing and receiving voice audio from the user. As discussed in more detail below with respect to FIG. 8, below, the device 100 also includes wireless communication electronics and an antenna for sending and receiving data and voice transmissions over a wireless communications network.

In this example, the device 100 includes a touch sensor 102 that is a transparent sensor configured to detect and track multiple touch input from the user. The touch sensor 102 may be used to input commands to the device 100, including, for example, a camera shutter command, a video record command, or other control related to the digital cameras 110, 120. The touch sensor may also be used to provide user controls for operation of the mobile phone or other functionality provided on the device 100. The touch sensor 102 may be formed from a grid of transparent conductive traces configured to detect a touch using a capacitive sensing technique. Alternatively, the touch sensor 102 can be formed from a non-transparent sensor and implement non-capacitive sensing techniques.

The device 100 may also accept user input via the control button 103. The control button 103 may provide, for example, a camera shutter command, a video record command, or other control related to the digital cameras 110, 120. The control button 103 may be used as a user control to toggle the display 101 on or off. The operation of the control button 103 can be used to control various other functions on the device 100.

As shown in FIG. 1A, the device includes a front camera 110 for capturing an image or video of objects located proximate to the front side of the device 100. The front camera 110 includes a digital image sensor and one or more optical elements for directing light onto the digital image sensor. The front camera 110 is proximate to the display 101 of the device. The proximity of the front camera 110 and the display screen 101 may be advantageous when calculating an ambient light estimate that corresponds to the lighting condition in which the display 101 is being viewed.

As shown in FIG. 1B, the device also includes a rear camera 120 for capturing an image or video of objects located proximate to the rear side of the device 100. The rear camera 120 also includes a digital image sensor and one or more optical elements for directing light onto the digital image sensor.

The image sensor used for the front 110 and rear 120 cameras includes a sensor array or matrix. For example, the image sensor may include a charge-coupled device (CCD) sensor array or a complementary metal-oxide-semiconductor (CMOS) image sensor array. A typical sensor array may include a two-dimensional array of sensor cells, where each cell may include a photo detector, such as a photodiode, and one or more transistors to activate each pixel.

The image sensor is configured to produce a digital image comprised of an array of pixels that may be stored in a computer memory storage element of the device 100. Each pixel represents a small pixel area of the digital image and includes color and light information for the pixel area that corresponds to a portion of the image sensor. In one example, each pixel includes a red, green, and blue color value representing the respective amounts of each color for a pixel area of a digital image. In another example, each pixel includes an intensity value, brightness value, hue value, color value, saturation value, or other values that represent the quality and/or quantity of the light that is incident on the corresponding portion of the image sensor.

In many cases, the pixels of the digital image do not correspond one-to-one with an element or sensor cell of the image sensor. In one example each pixel in the digital image may correspond to four sensor cells, each cell configured to respond to a different color of light. In another example, each image pixel corresponds to a large group of adjacent sensor cells resulting in a digital image having a more course resolution than the digital sensor array. This approach may be advantageous in that it reduces the amount of computer memory and computer processing resources that are required to process the digital image.

As previously discussed, a digital image produced by an image sensor can be used to compute an overall brightness value or estimation of luminous flux that represents an ambient light condition surrounding a portion of the electronic device. As described in more detail below with respect to FIGS. 2A-B, a digital image can be used to compute a scene brightness or illuminance value that corresponds to an ambient light condition proximate to an image sensor. In some cases, the digital image can be used to compute a scene brightness or illuminance value that corresponds to the output of a traditional, stand alone, ambient light sensor.

As shown in FIGS. 1A-B, the device 100 is a portable electronic device, specifically a mobile telephone. However, the device 100 may be any one of a variety of devices that includes a digital camera. For example, the device 100 may be another type of portable electronic device, such as a portable media player, digital camcorder, notepad, or other handheld appliance. Similarly, a digital camera operating as an ambient light sensor may also be integrated into a variety of other devices, including, for example, tablet computers, notebook computers, electronic appliances, and wearable devices.

2. Method of Generating an Ambient Light Estimate

As previously discussed, the image sensor of a digital camera can be used to estimate an ambient light condition near and around an electronic device. In particular, an image sensor can be operated in two or more modes. For example, in a first camera mode, the image sensor can be configured to produce a full-resolution image of an object or a scene in the field of view of the digital camera. In a second light-sensor mode, the image sensor can be configured to produce a characteristic response or output that represents the ambient light conditions proximate to the digital camera. When the image sensor is operated in a light-sensor mode, a subset of the sensor cells may be used to generate an array of pixels. The array of pixels may be referred to herein as a "digital image." Because a subset of the sensor cells of the image sensor are used, the resulting digital image may not have the resolution sufficient to produce a photorealistic image or picture. In contrast, the full-resolution digital image produce when operating in a camera mode will typically have a resolution that is sufficient to create a photorealistic image.

In some cases, the image sensor operates continuously or near-continuously in a light-sensor mode and then switches to a camera mode in response to a user command to take a picture or video. Other operational modes are possible and generally include the image sensor operating in a light-sensor mode a portion of the time, and in one or more other modes at other times.

Figure 2:
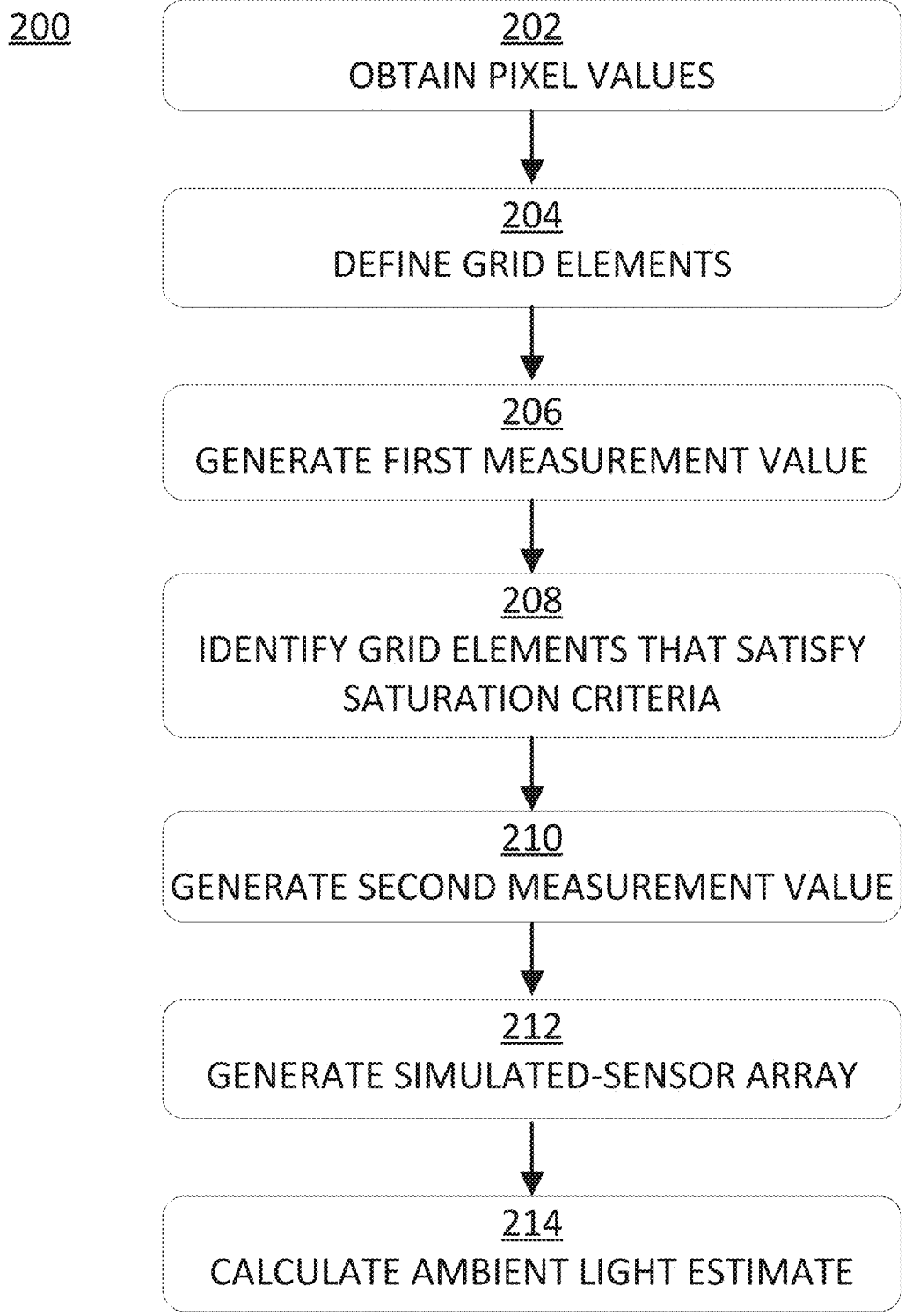
FIG. 2 depicts an example process for estimating an ambient light condition using a digital image.

FIG. 2 depicts an example process for estimating an ambient light condition using a digital image. The processes depicted in FIGS. 2A-B can be used, for example, to process digital images produced by an image sensor operating in an ambient-light-sensor mode to produce an output similar to a traditional stand-alone ambient light sensor. In some cases, the output or calculated values are used to control operation of other aspects of the device, including, for example, the brightness of the display screen or the operation of a touch screen.

FIG. 2 depicts an exemplary process 200 for estimating an ambient light condition using a digital image obtained from an image sensor. In particular, process 200 can be used to estimate an ambient light condition by compensating for the relatively small field of view of an image sensor as compared to a traditional ambient light sensor.

Figure 3A:
FIG. 3A depicts a full-resolution digital image obtained using the digital camera in a camera mode.
Figure 3B:
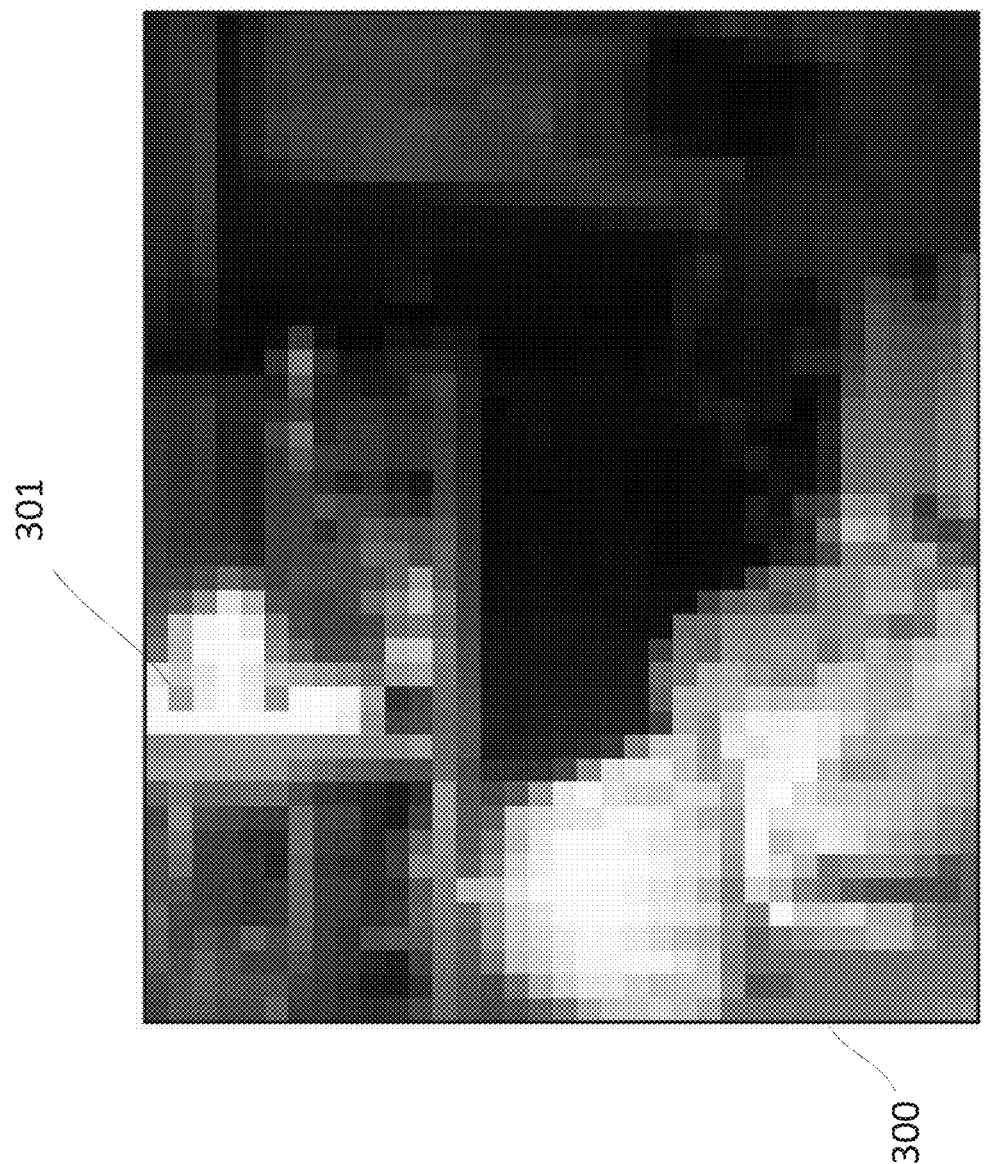
FIG. 3B depicts a low-resolution digital image obtained using the digital camera in a light-sensor mode.

In operation 202, an array of pixels is obtained. In one example, the array of pixels may be a digital image obtained from an image sensor. FIG. 3B depicts an example of a digital image 300 obtained using a camera in light-sensor mode. With reference to FIG. 3B, a digital image 300 formed from a two-dimensional array of pixels 301. As previously mentioned, the array of pixels obtained using a camera in light-sensor mode may be referred to as a "digital image" even though the resolution may not be sufficient for photorealistic viewing purposes. Because the digital image produced in light-sensor mode is used to estimate lighting conditions, it is not typically displayed in a visual format as depicted in FIG. 3B. Compare the image 350 depicted in FIG. 3A, which was taken of the same scene using an image sensor in camera mode.

With reference to FIG. 3B, each pixel 301 in the array represents a small pixel area of the digital image 300 and includes color and light information for the pixel area that corresponds to a portion of the image sensor. For example, each pixel 301 may include one or more color values, an intensity value, a brightness value, a hue value, a saturation value, or other values that represent the quality and/or quantity of the light associated with the corresponding pixel area of the digital image 300.

With respect to operation 202, it may be advantageous to use a digital image (array of pixels) produced by an image sensor operating in light-sensor mode. In particular, the image produced in light-sensor mode may be much lower resolution and result in a reduction in computational and memory resources. In addition, the image sensor may consume less power when operated in light-sensor mode as compared to camera mode, which may prolong battery life. While there may be advantages to using a low-resolution digital image, the array of pixels obtained in operation 202 may also be obtained from a full resolution image produced from an image sensor operating in a camera mode.

With respect to operation 202, the array of pixels may be obtained using the image sensor over an electronic bus and stored, at least temporarily, in computer memory. In some cases, the array of pixels are stored as a digital image in a Joint Photographic Experts Group (JPEG), Graphics Interchange Format (GIF), Tagged Image File Format (TIFF), or other type of image format file. In some cases, with respect to operation 202, the array of pixels are obtained from an image file that is stored in computer memory.

Figure 4:
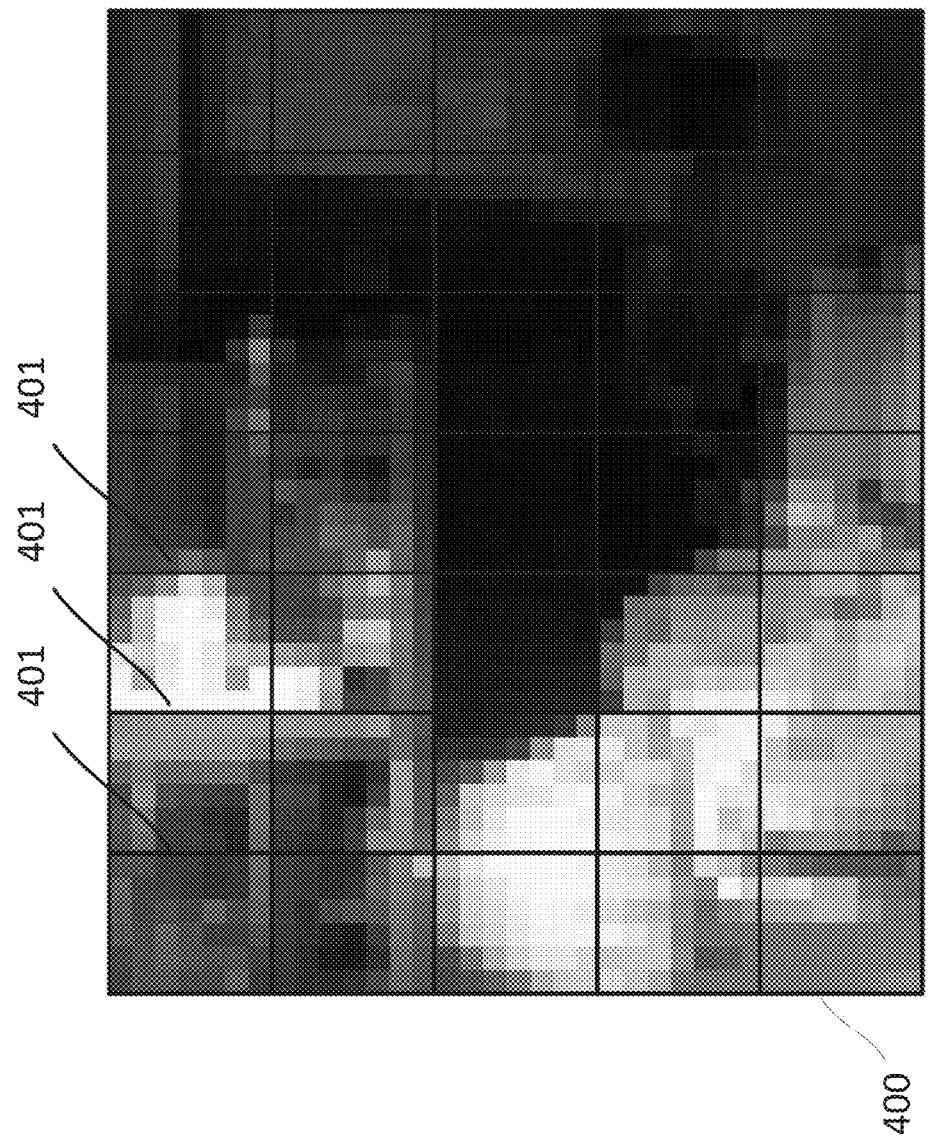
FIG. 4 depicts a matrix of grid elements.

In operation 204, a matrix of grid elements are defined. In particular, a matrix of grid elements are defined based on the array of pixels, where each grid element includes a group of multiple adjacent pixels. By way of example, FIG. 4 depicts an array 400 of grid elements 401, which in this case are defined based on a rectilinear grid of grid element boundaries. As shown in FIG. 4, each grid element 401 includes a group of adjacent pixels 301 that fall within a respective grid element boundary.

For purposes of process 200, the ratio of the grid element size as compared to the overall area of the pixel array (e.g., digital image) may be selected to optimize performance of the device. For example, if the grid elements are too large, the matrix of grid elements may be too course to accurately represent the amount of light incident on the image sensor. Also, if the grid elements are too small, processing the matrix of grid elements may consume unnecessary computer resources and device power. Accordingly, in some cases, the area of each grid element may be no greater than 8% of the overall area of the pixel array and no less than 0.25% of the overall area of the pixel array. In one example, the area of each grid element is approximately 0.5% of the total area of the pixel array.

In operation 206, a first measurement value is generated for a grid element of the matrix of grid elements. In particular, a first measurement value is generated that represents a composite of the pixels associated with a respective grid element. In one example, a mean brightness value is generated based on the group of pixels associated with the grid element. In this example, the mean brightness value is used to represent the amount of light incident to an area of the image sensor that corresponds to the grid element. The mean brightness value may be generated by taking the arithmetic mean of the brightness value of all of the pixels associated with a respective grid element. The brightness value of each pixel element may be computed based on the intensity of the individual color components of the pixel. For example, a pixel may have red, blue, and green color components, each component having an intensity value that is used to calculate an overall pixel brightness. In another example, the first measurement value may be calculated using another statistical measurement of the pixels associated with the grid element. For example, the first measurement value maybe calculated by taking a weighted mean, an integral, or other statistical measurement of the pixels associated with the grid element. Additionally, a variety of values associated with a pixel, including brightness, intensity, saturation, hue, or other value that represents the quality and/or quantity of the light incident on the image sensor may be used to generate the first measurement value.

Figure 5:
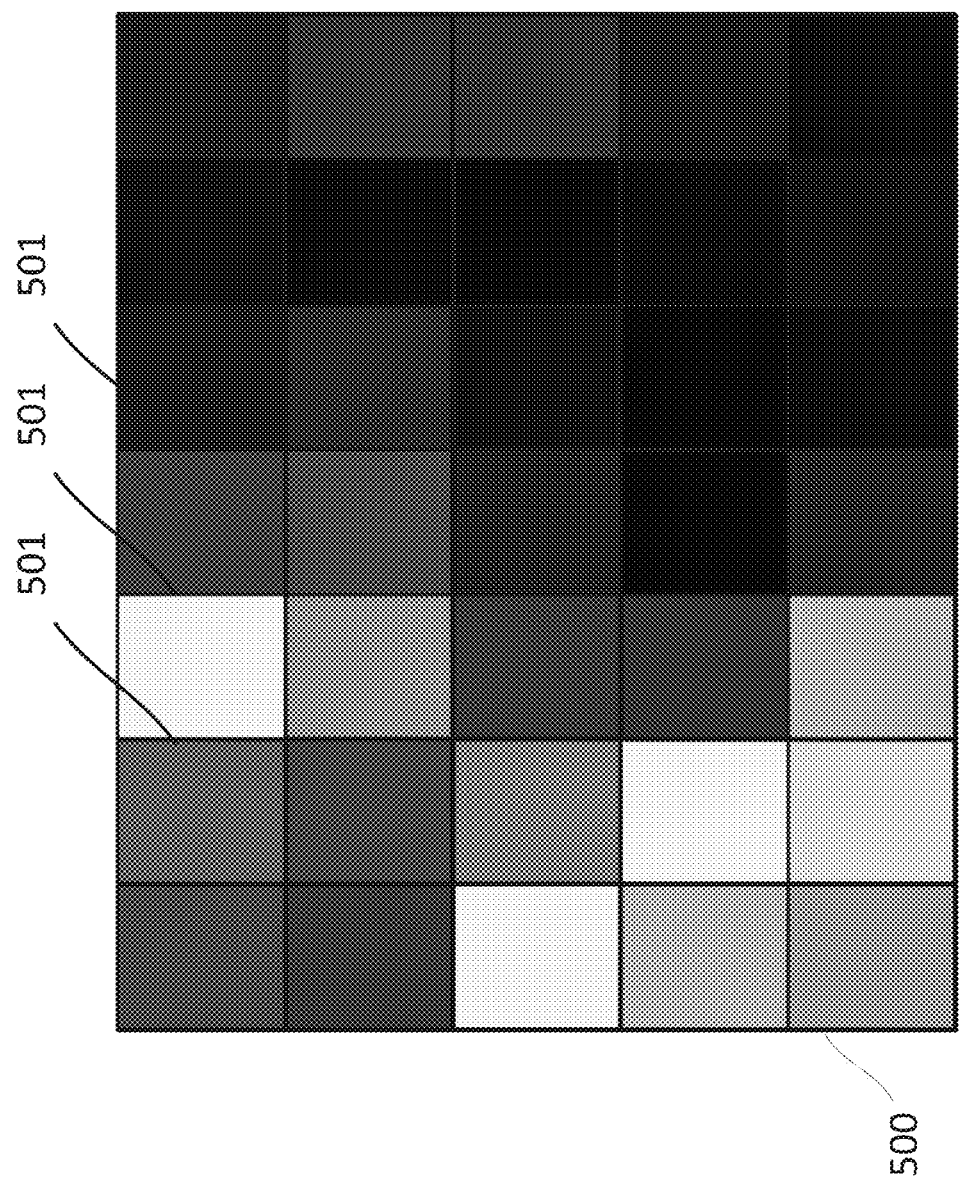
FIG. 5 depicts a matrix of grid elements shaded according to respective first measurement values.

Operation 206 may be repeated for multiple grid elements of the matrix. In some cases, a first measurement value is generated for every grid element of the matrix. FIG. 5 depicts an example matrix 500 of grid elements 501 having a corresponding first measurement value. Each grid element 501 is shaded according to the corresponding first measurement value, which in this case is a mean brightness value.

In operation 208, a set of grid elements are identified that satisfy a brightness criteria. In particular, the grid elements that have a first measurement value that satisfies a brightness criteria are identified. In some cases, regions of high intensity or high brightness in the grid matrix have an undesirable effect on an ambient light computation. In particular, the presence of grid elements having a relatively high intensity or brightness may result in an ambient light computation that is higher than actual ambient lighting conditions. A similar effect may result from grid elements that have a very low intensity or low brightness. Thus, in operation 208 a brightness criteria is applied to identify grid elements that may reduce the accuracy of an ambient light computation.

In once example, grid elements are identified which have a first measurement value that are greater than a specified number of standard deviations away from a mean or average of all of the first measurement values obtained for the matrix of grid elements. In another example, grid elements are identified as those elements that have a first measurement value that differs by a fixed amount from the average or a specified measurement value. Alternatively, the grid elements may be selected using a heuristic method or approach. For example, the grid elements may be selected based on face or object recognition. The grid elements may also be selected based on a statistical analysis of image colors to determine characteristic regions in a scene.

Figure 6A:
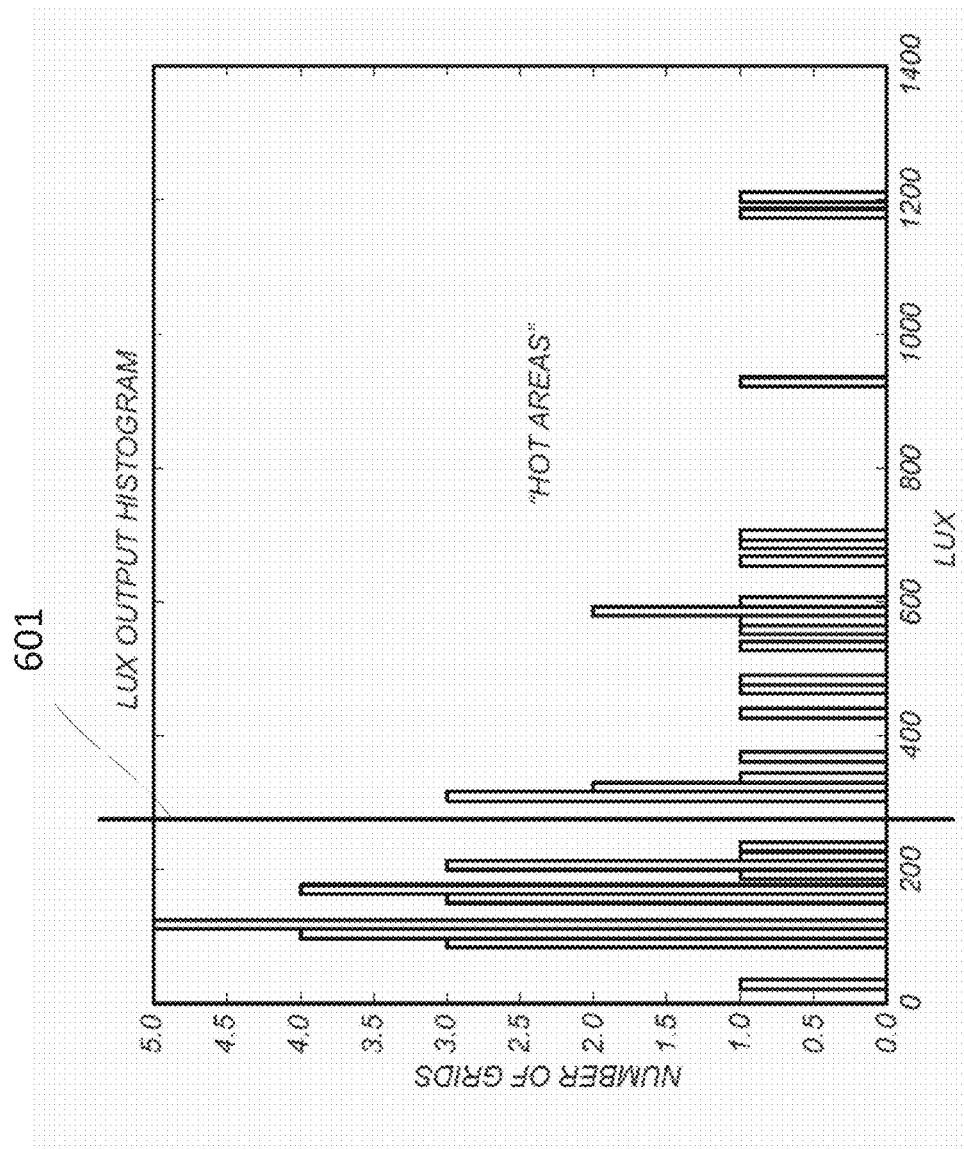
FIG. 6A depicts a histogram of first measurement values for a matrix of grid elements.
Figure 6B:
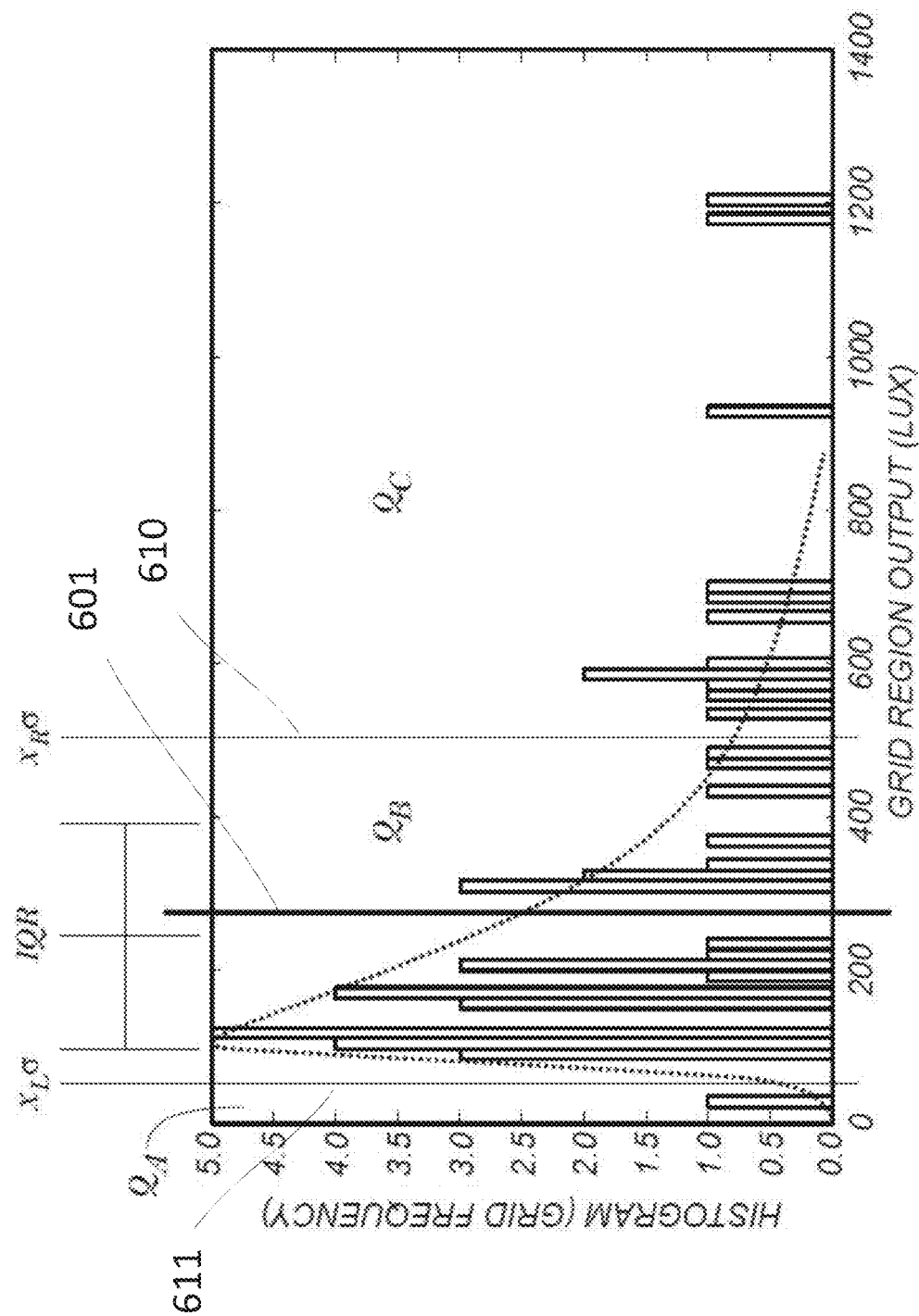
FIG. 6B depicts a histogram of first measurement values and thresholds.

By way of example, FIGS. 6A-B depict an example histogram of the first measurement values for a matrix of grid elements. As shown in FIGS. 6A-B, the height of the bars represents the number of grid elements having a corresponding mean brightness (example first measurement value). FIG. 6B also depicts brightness threshold 610, 611 used to distinguish grid elements having different levels of brightness or intensity.

As shown in FIGS. 6A-B, the brightness criteria is based on the mean brightness 601 of the matrix of grid elements. In this example, the first measurement value of the grid elements is a brightness value corresponding to the intensity of the light incident on a region of the sensor. The following technique can also be applied for other types of first measurement values obtained in operation 206, above. In the example depicted in FIG. 6B, two thresholds 610, 611 are defined based on the mean brightness 601. Specifically, a low threshold 611 is defined as being $x_L$ standard deviations σ below the mean and a high threshold 610 is defined as being $x_H$ standard deviations σ above the mean. The grid elements having a brightness value below the low threshold 611 are identified as low-brightness grid elements $Q_A$ and, similarly, grid elements having a brightness value above the high threshold 610 are identified as high-brightness grid elements $Q_C$. Grid elements having a brightness value greater than or equal to the low threshold 611 and less than or equal to the high threshold 610 are identified as medium-brightness grid elements $Q_B$. While in this example, two thresholds are used to identify three classifications of grid elements, more than two thresholds could also be used to identify additional classifications of grid elements.

With respect to operation 208, the one or more classification of grid elements may be identified by and then stored using a designation, such as a flag, character or data indicator, to preserve the identification of the grid elements in computer memory.

In operation 210, a second measurement value is generated. In particular, a second measurement value is generated using the first measurement values of the grid elements identified in operation 208. In one example, the second measurement value is an overall brightness value for the matrix of grid elements. For example, the overall brightness value may be generated by taking the arithmetic mean of the mean brightness value of all of the grid elements in the matrix. In this case, the second measurement value represents a measure of all the light incident on the image sensor.

However, in some instances, localized bright regions or localized dark regions in the grid matrix have an undesirable influence on the second measurement value. To reduce the effects of outlier regions, the brightness values of those grid elements may be weighted by calculating a weighted measurement value. In one example, the weighted measurement value is generated using a weighting value to reduce the effect of the high-brightness grid elements $Q_C$. For example, a first weighted measurement value $W_C$ can be calculated as:

$$W_C = R_C * I_{QC} + (1 - R_C) * I_M, \quad \text{(Equation 1)}$$

where $I_M$ is the average brightness of all grid elements (or another statistical or heuristic value), $I_{QC}$ is the brightness of a high-brightness grid element $Q_C$, and $R_C$ is a weighting factor. Because, in this case, it is desired that the effects of the high-brightness grid elements $Q_C$ be reduced, the weighting factor $R_C$ is typically less than 1. In some cases, to eliminate the effects of a classification of grid elements, the weighting factor can be effectively 0. This may then be repeated for all of the identified high-brightness grid elements $Q_c$ in the matrix of grid elements.

Similarly, a second weighted measurement value can be generated using a weighting value to reduce the effect of the low-brightness grid elements $Q_A$. For example, a weighted measurement value $W_A$ can be calculated as:

$$W_A = R_A * I_{QA} + (1-R_A) * I_M, \qquad \text{(Equation 2)}$$

where $I_{QA}$ is the brightness of a high-brightness grid element $Q_A$ and $R_A$ is a weighting factor. Because, in this case, it is desired that the effects of the low-brightness grid elements $Q_A$ be reduced, the weighting factor $R_A$ is typically less than 1. In some cases, to eliminate the effects of a classification of grid elements, the weighting factor can be effectively 0. This may then be repeated for all of the identified low-brightness grid elements $Q_A$ in the matrix of grid elements. In other implementations, additional weighted measurement values can also be generated based on additional identified classifications of grid elements.

In operation 212, a simulated-light-sensor array is generated. In particular, the second measurement value computed in operation 210 can be used to generate the simulated-light-sensor array. As previously mentioned, the field of view of a typical image sensor may be many times less than the field of view of a large area ambient light sensor. In some cases, the field of view of the image sensor is approximately 100 times less than an ambient light sensor. To compensate for the difference in the field of view between the two sensors, a simulated-light-sensor array can be constructed by generating an array that represents the larger field of view.

In one example, the simulated-light-sensor array is constructed based on an assumption that the lighting conditions in the original image are relatively consistent across a wider area than the field-of-view of the image sensor. In one example, a simulated-light-sensor array is defined and the matrix of grid elements are extrapolated over the entire simulated-light-sensor array. For example, a simulated-light-sensor array may be defined based on the size of the (desired) simulated sensor. Multiple elements or cells of the simulated-light-sensor array may be set at the second measurement value (e.g., the overall brightness value) determined based on the matrix of grid elements.

Figure 7:
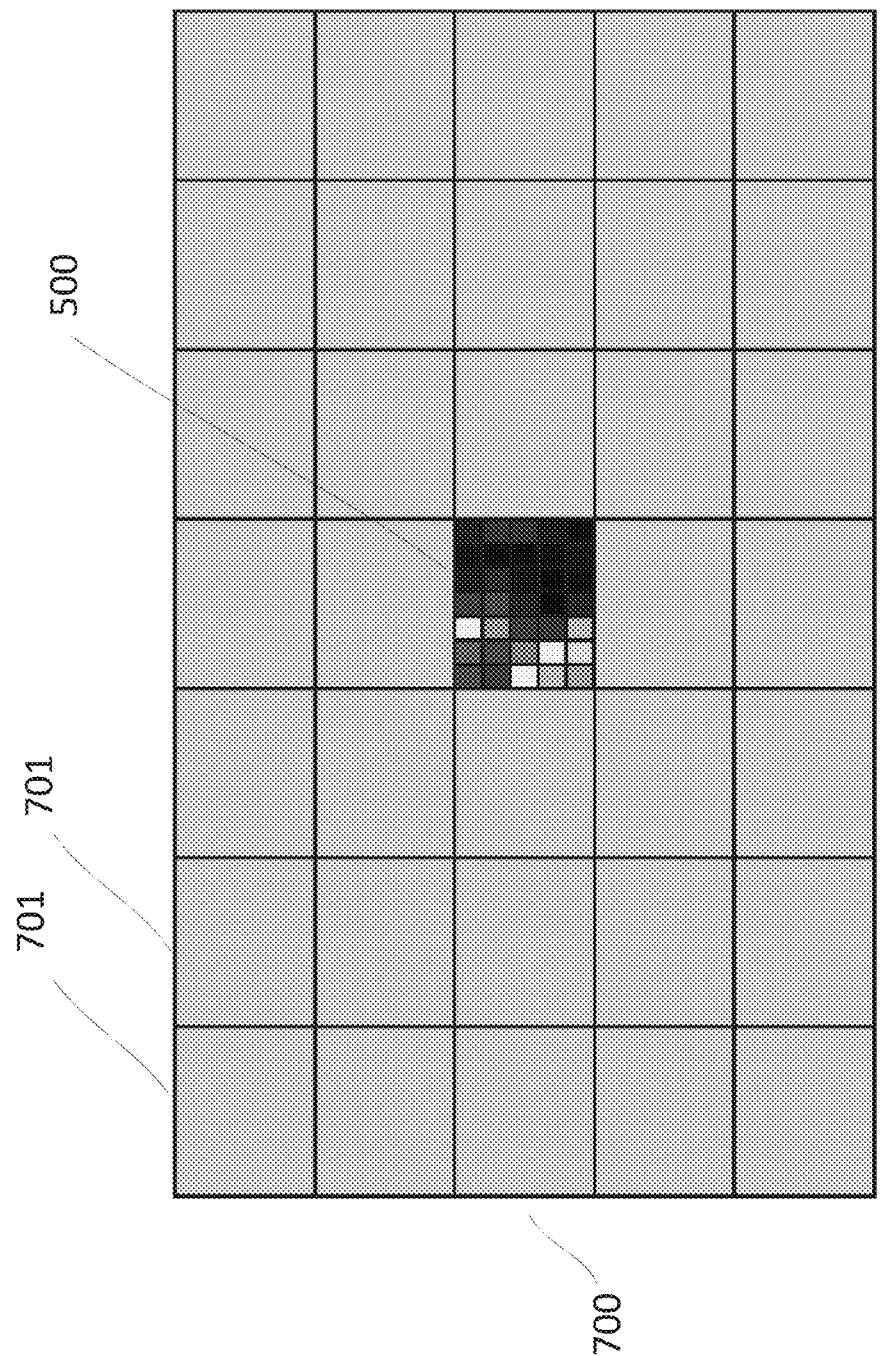
FIG. 7 depicts an example simulated-light-sensor-array.

FIG. 7 depicts a visualization of a simulated-light-sensor array 700 having cells 701. As mention previously, the size of the simulated-light-sensor array 700 may be determined by the relative difference between the field of view of the image sensor and the field of view of a hypothetical ambient light sensor. As shown for comparison in FIG. 7, the center cell of the simulated-light-sensor array 700 includes the original matrix of grid elements 500 with each grid element shaded according to a corresponding mean brightness value (example first measurement value). In this example, the field of view of the simulated-light-sensor is 35 times greater than the field of view of the image sensor represented by the matrix of grid elements 500. Thus, to generate the simulated-light-sensor array 700, an array of 5×7 cells are generated, each cell set to the second measurement value (e.g., overall brightness value).

Alternatively, the matrix of grid elements may be extrapolated over the simulated-light-sensor array using another technique. For example, the elements of the simulated-light-sensor array may correspond to the special distribution of the brightness values of the matrix of grid elements.

In operation 214, an ambient light estimate is calculated. In particular, the ambient light estimate is calculated using the simulated-light-sensor array generated in operation 212, above. In one example, the ambient light estimate is a function based on the values of the cells of the simulated-light-sensor array. Additionally, the ambient light estimate may be a function of the current and one or more previous ambient light estimates.

In one example, the ambient light estimate represents the collective luminous emittance of all the light sources that produce light incident on the image sensor. The ambient light estimate may be expressed in terms of a luminous flux per unit area having the SI unit LUX. In one example, the ambient light estimate represents the amount of visible light photons that are incident over the area of the image sensor. In some cases, the ambient light estimate corresponds to an output produced by a traditional light meter or lux meter.

The example process 200 discussed above is typically repeated at regular intervals while the device is powered on. In one example, a digital image is captured at regular intervals using the image sensor and stored in a memory cache. The digital image can be processed using the example process 200 to obtain an ambient light estimate that corresponds to the digital image. Alternatively, the process 200 can be performed intermittently in response to a user command or in response to another subsystem operating on the device, such as a digital camera. Additionally, because the image sensor is used for both the ambient light estimate and to operate as a digital camera, the execution of process 200 may be delayed or suspended while a digital camera operation is performed. Alternatively, execution of process 200 may be performed by a processor in a software implementation (instead of a hardware only implementation, for example) while the image sensor is being used as a digital camera, so as to provide continuous ambient light readings. A processor-enabled software implementation may also be advantageous by not requiring that the execution be performed while a digital camera operation is not being performed.

The ambient light estimate is typically stored in computer memory and may be used by other aspects of the device. For example, the ambient light estimate may be used by a subsystem that controls the display of the device to adjust the brightness of the display. For example, if the ambient light estimate corresponds to an indoor lighting condition, the brightness of display of the device may be set to be less bright than if the ambient light estimate corresponds to an outdoor lighting condition. Changes in the ambient light estimate may also be used to drive changes in the brightness of the display. For example, if the ambient light estimate increases, the brightness of the display can also be increased to improve visibility of the display in brighter lighting conditions.

The ambient light estimate may also be used to control the operation of a touch input sensor, such as a capacitive touch screen. For example, if the ambient light estimate makes a rapid change to a low lighting condition, it may be an indication that the device has been placed against the user's face to make a phone call or has been placed in a pocket or case for storage. In response to the sudden change in the ambient light estimate, a subsystem of the device may suspend or deactivate operation of the touch screen to avoid unintended touch input. Additionally, the display or display backlight of the device may be suspended or turned off in response to a sudden change in the ambient light, which may indicate that the device has been placed in a pocket or case where the display does not need to be visible.

In one example, a change in the ambient light estimate can be used to control the brightness of a display. For example, a first ambient light estimate may be calculated at a first time using process 200. A second ambient light estimate may then be calculated at a second time using process 200. A difference between the first and second ambient light estimates can be determined and the brightness of the display may be set or modified based on the difference. For example, if the second ambient light estimate is greater than the first ambient light estimate, the brightness of the display may be increased. Similarly, if the second ambient light estimate is less than the first ambient light estimate, the brightness of the display may be reduced.

The ambient light estimate may also be used as a light meter to adjust exposure settings for the camera. For example, the shutter speed, shutter aperture, and/or ISO settings may be adjusted in response to the ambient light estimate. Additionally, the ambient light estimate may be used as a presence or proximity sensor. That is, the ambient light estimate may be used to predict how far a person's face or body is from the display or camera. The ambient light estimate may also be used to adjust the display brightness to improve battery life. The ambient light estimate may also be used to detect indoor/outdoor conditions and heat radiance onto the device in order to help manage thermal heat loads dynamically within the device. For example, heat dissipation may be directed to a back surface of the device if sunlight is detected on the front surface.

3. Device Having an Image Sensor

Figure 8:
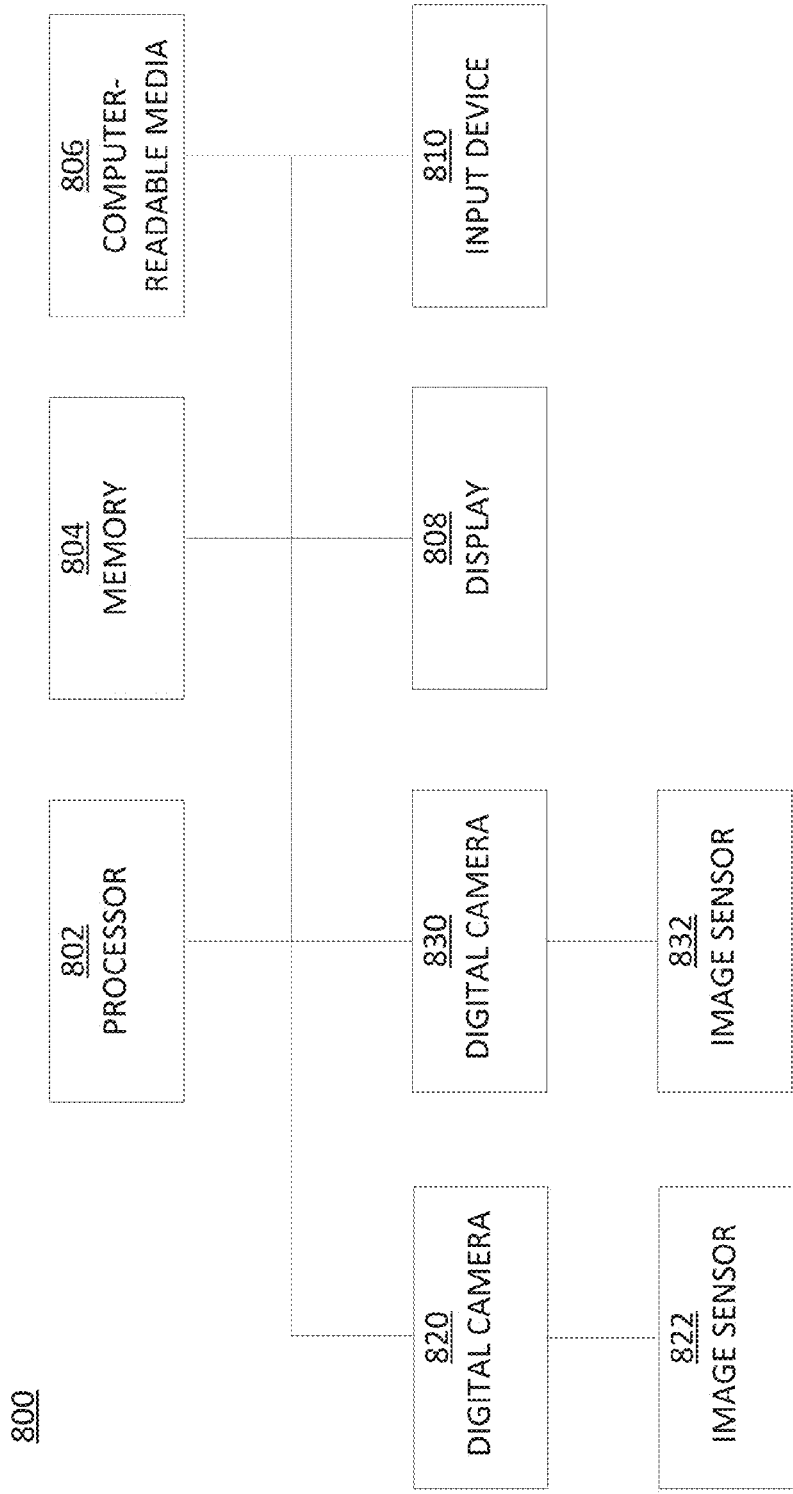
FIG. 8 depicts a schematic representation of an example device having an image sensor.

FIG. 8 depicts a schematic representation of an example device having an image sensor. The schematic representation depicted in FIG. 8 may correspond to components of the portable electronic device depicted in FIGS. 1A-B. However, FIG. 8 may also more generally represent other types of devices that are configured to use an image sensor to estimate ambient light conditions.

As shown in FIG. 8, a device 800 includes a processor 802 operatively connected to computer memory 804 and computer-readable media 806. The processor 802 may be operatively connected to the memory 804 and computer-readable media 806 components via an electronic bus or bridge. The processor 802 may include one or more computer processors or microcontrollers that are configured to perform operations in response to computer-readable instructions. The processor 802 may include the central processing unit (CPU) of the device. Additionally or alternatively, the processor 802 may include other processors within the device including application specific integrated chips (ASIC) and other microcontroller devices.

The memory 804 may include a variety of types of non-transitory computer-readable storage media, including, for example, read access memory (RAM), read-only memory (ROM),), erasable programmable memory (e.g., EPROM and EEPROM), or flash memory. The memory 804 is configured to store computer-readable instructions, sensor values, and other persistent software elements. Computer-readable media 806 also includes a variety of types of non-transitory computer-readable storage media including, for example, a hard-drive storage device, solid state storage device, portable magnetic storage device, or other similar device. The computer-readable media 806 may also be configured to store computer-readable instructions, sensor values, and other persistent software elements.

In this example, the processor 802 is operable to read computer-readable instructions stored on the memory 804 and/or computer-readable media 806. The computer-readable instructions may adapt the processor 802 to perform the operations of process 200 described above with respect to FIG. 2. The computer-readable instructions may be provided as a computer-program product, software application, or the like.

As shown in FIG. 8, the device 800 also includes a display 808 and an input device 810. The display 800 may include a liquid-crystal display (LCD), organic light emitting diode (OLED) display, light emitting diode (LED) display, or the like. If the display 800 is an LCD, the display may also include a backlight component that can be controlled to provide variable levels of display brightness. If the display 800 is an OLED or LED type display, the brightness of the display may be controlled by controlling the electrical signal that is provided to display elements.

The input device 810 is configured to provide user input to the device 800. The input device 810 may include, for example, a touch screen, touch button, keyboard, key pad, or other touch input device. The device 800 may include other input devices, including, for example, power button, volume buttons, home buttons, scroll wheels, and camera buttons.

As shown in FIG. 8, the device 800 also includes two digital cameras 820 and 830. With reference to FIGS. 1A-B, a one digital camera may correspond to the front camera 110 and the other digital camera may correspond to the rear camera 120. As shown in FIG. 8, the digital camera 820 includes an image sensor 322, and the digital camera 830 includes another image sensor 832. The digital cameras 820, 830 also include one or more optical lenses for focusing the light onto the image sensors 822, 832. The digital cameras 820, 830 may also include electronics for capturing signals produced by the image sensors 822, 832 and may also include limited computer processing capability and computer memory storage. Although device 800 is depicted as having two digital cameras, in an alternative embodiment, the device 800 may only include a single camera, or, alternatively, may include more than two cameras.

In this example, each image sensor 822, 832 includes a sensor array or matrix. For example, the image sensor may include a charge-coupled device (CCD) sensor array or a complementary metal-oxide-semiconductor (CMOS) image sensor array. A typical sensor array may include a two-dimensional array of sensor cells, where each cell may include a photo detector, such as a photodiode, and one or more transistors to activate each pixel.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

We claim:

1. A computer-implemented method of calculating an ambient light estimate using an image sensor in a camera of a device, the method comprising:
   obtaining an array of pixels using the image sensor;
   defining a matrix of grid elements, each grid element comprised of multiple adjacent pixels of the array of pixels;
   generating a first measurement value for a grid element of the matrix of grid elements based on the pixels associated with a respective grid element;
   identifying a set of grid elements having first measurement values that satisfy a brightness criteria;
   generating a second measurement using the identified set of grid elements;

generating a simulated-light-sensor array, having a larger field of view than the field of view of the image sensor, using the second measurement value; and calculating the ambient light estimate using the simulated-light-sensor array.

2. The computer-implemented method of claim 1, wherein generating the first measurement value includes calculating a mean brightness value using the pixels associated with the grid element.

3. The computer-implemented method of claim 1, wherein generating the second measurement value includes calculating an overall brightness value using first measurement values associated with the matrix of grid elements.

4. The computer-implemented method of claim 1, wherein the brightness criteria is a threshold value and the identified set of grid elements have first measurement values that exceed the brightness criteria.

5. The computer-implemented method of claim 4, wherein the threshold value is a multiple of a standard deviation from a mean intensity value.

6. The computer-implemented method of claim 4, wherein the threshold value is a fixed offset from a mean intensity value.

7. The computer-implemented method of claim 1, wherein the estimate of the ambient light condition is an illuminance value that represents a luminous flux of light incident on the image sensor.

8. The computer-implemented method of claim 1, wherein an area of the grid element is approximately 0.5% of a total area of the array of pixels.

9. The computer-implemented method of claim 1, wherein the array of pixels are generated using a subset of sensor cells of the image sensor while the image sensor is operating in a light-sensor mode.

10. The computer-implemented method of claim 9, further comprising:
generating a digital image using a full set of sensor cells of the image sensor operating in a camera mode; and
storing the digital image in computer memory.

11. The computer-implemented method of claim 1, further comprising:
setting the brightness of a display of the device based on the ambient light estimate.

12. The computer-implemented method of claim 1, further comprising:
calculating a first ambient light estimate using a first array of pixels obtained using the image sensor;
calculating a second ambient light estimate using a second array of pixels obtained using the image sensor;
determining a difference between the first ambient light estimate and the second ambient light estimate; and
setting the brightness of a display of the device based on the difference.

13. The computer-implemented method of claim 12, wherein the brightness of the display is increased if the second ambient light estimate is greater than the first ambient light estimate, and wherein the brightness of the display is decreased if the second ambient light estimate is less than the first ambient light estimate.

14. A portable electronic device configured to calculate an ambient light estimate, the portable electronic device comprising:
a digital camera having an image sensor, wherein the image sensor is formed from an array of sensor cells;
a computer processor for executing computer-readable instructions;
a computer memory for storing the computer-readable instructions, the instructions for:
obtaining an array of pixels using the image sensor;
defining a matrix of grid elements, each grid element comprised of multiple adjacent pixels of the array of pixels;
generating a first measurement value for a grid element of the matrix of grid elements based on the pixels associated with a respective grid element;
identifying a set of grid elements having a first measurement value that satisfies a brightness criteria;
generating a second measurement using the identified set of grid elements;
generating a simulated-light-sensor array, having a larger field of view than the field of view of the image sensor, using the second measurement value; and
calculating the ambient light estimate using the simulated-light-sensor array.

15. The portable electronic device of claim 14, further comprising:
a display having an adjustable brightness, wherein the digital camera is located proximate to the display, the instructions also for:
setting the brightness of the display of the device based on the ambient light estimate.

16. The portable electronic device of claim 15, the instructions also for:
calculating a first ambient light estimate using a first array of pixels obtained using the image sensor;
calculating a second ambient light estimate using a second array of pixels obtained using the image sensor;
determining a difference between the first ambient light estimate and the second ambient light estimate; and
setting the brightness of the display of the device based on the difference.

17. The portable electronic device of claim 16, wherein the brightness of the display is increased if the second ambient light estimate is greater than the first ambient light estimate, and wherein the brightness of the display is decreased if the second ambient light estimate is less than the first ambient light estimate.

18. The portable electronic device of claim 14, wherein the image sensor is a charge coupled device (CCD) sensor array.

19. The portable electronic device of claim 14, wherein the image sensor is a complementary metal-oxide-semiconductor (CMOS) image sensor array.

20. The portable electronic device of claim 14, further comprising:
a second digital camera having a second image sensor, wherein the second image sensor is formed from a second array of sensor cells.

* * * * *